Sept. 23, 1924.
G. R. HALLOCK ET AL
1,509,143
VEHICLE TOP
Filed March 18, 1921
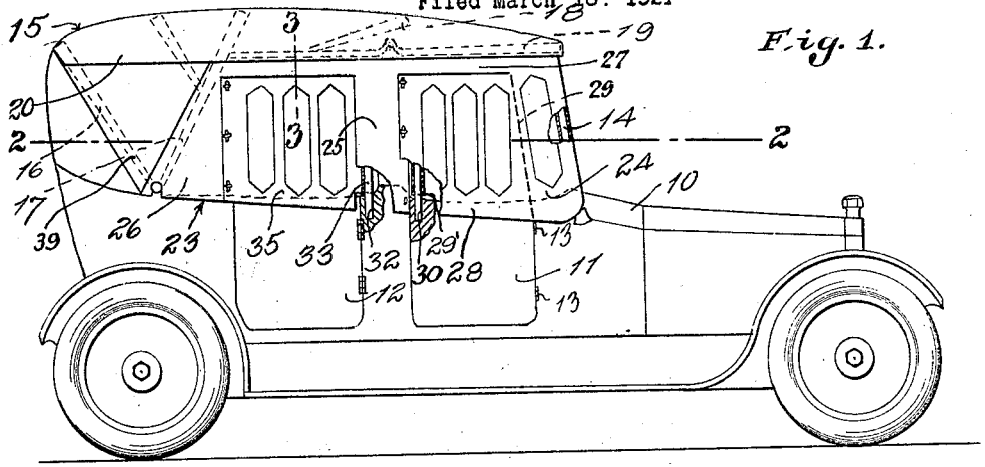
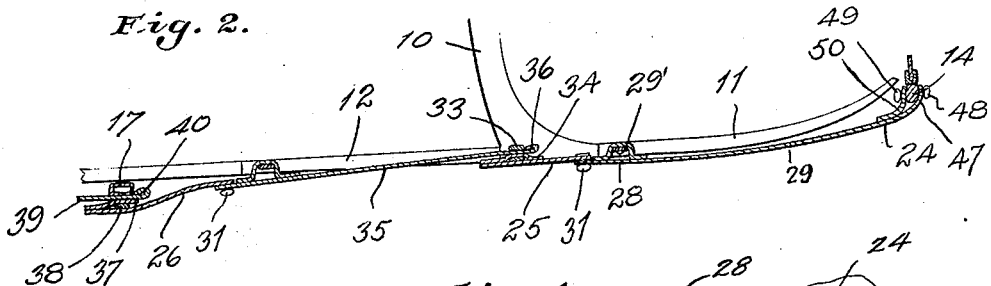
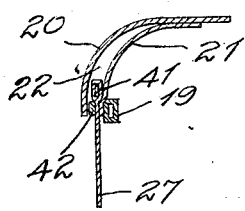
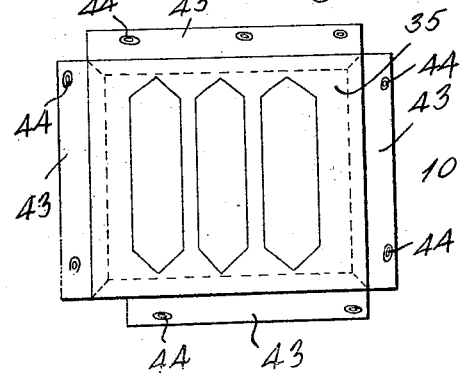
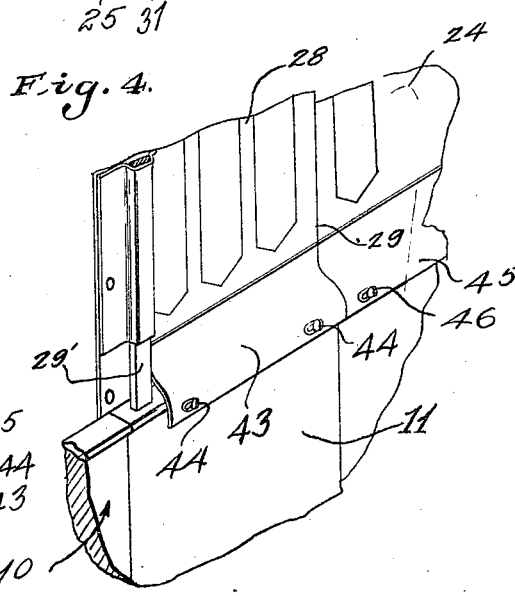
Inventors
Guy R. Hallock and
Ralph Villane
By their Attorney
Charles L. Wright Patented Sept. 23, 1924.

1,509,143

UNITED STATES PATENT OFFICE.

GUY R. HALLOCK AND RALPH VILLANE, OF DULUTH, MINNESOTA.

VEHICLE TOP.

Application filed March 18, 1921. Serial No. 453,351.

*To all whom it may concern:*

Be it known that we, GUY R. HALLOCK, a citizen of the United States, and RALPH VILLANE, a subject of the King of Italy, both residing in Duluth, county of St. Louis, and State of Minnesota, have invented certain new and useful Improvements in Vehicle Tops, of which the following is a specification.

This invention relates to improvements in tops for motor vehicles and is more particularly adapted for use in connection with what are commonly known to the trade as "one man tops".

The principal object of the invention is to provide a top which may be utilized in all weather and which when closed not only provides complete protection for the occupants of the vehicle, but presents a neat and attractive appearance, closely resembling the appointments of a closed car.

Another object of the invention resides in the provision of a novel means for supporting the side curtains so that they will remain smooth and taut thereby presenting an extremely neat appearance.

With these and other objects in view the invention consists in the novel construction combination and arrangement of parts which will be fully set forth in the following specification, claimed and illustrated in the accompanying drawings in which:—

Figure 1 is a side view of a motor car illustrating this improved top in closed position.

Figure 2 is a longitudinal sectional view through line 2—2 of Fig. 1.

Figure 3 is a transverse sectional view through a fragment of the top taken on line 3—3 of Fig. 1.

Figure 4 is a fragmentary perspective view of the interior of the device showing parts broken away to more clearly illustrate the details of construction.

Figure 5 is a side view from the exterior of one of the curtains.

Referring to the drawings in detail the numeral 10 designates a motor vehicle of the ordinary four door type and the numerals 11 and 12 designate the forward and rear doors respectively which are hinged as at 13 to the car body. The usual wind shield supports are shown at 14 and are connected in the usual manner to the forward end of the folding top 15 which is supported on the usual top bows 16, 17, 18 and 19. The bows are pivoted in the customary manner to provide the supporting frame of what is commonly known as a "one man top".

The top material 20 is supported on the bows in the approved manner and extends downwardly upon the bows for a short distance as is customary. A flap 21 is secured to the inner side of the top material as shown in Fig. 3 and this flap is secured to the bows in such a manner as to allow the free edge of the top material at the sides of the top to hang loosely and provide a pocket 22 for the reception of the upper edges of the side curtains 23 which as shown consist of the forward, intermediate and rear panels 24, 25 and 26 respectively. The upper edges of these panels are preferably formed integrally with a longitudinally extending strip 27 but it is to be understood that if so desired said strip may consist of a separate piece to which the panels are sewn, glued or otherwise secured.

The front door curtain panel is designated by the numeral 28 and is connected along line 29 to the panel 24 while its rear end is supported on a rod 29' which is seated in a socket 30 formed in the upper edge of the door 11 adjacent its free end. As shown in Fig. 2 the rear edge of the panel 28 partly overlies the forward edge of the panel 25 and said parts may be provided with suitable securing elements such as buttons 31.

Seated in a socket 32 arranged in the upper edge of the car body and adjacent the forward edge of the rear door 12 is a forked rod 33 between the tines of which are received a flap 34 which is secured at the rear edge of the panel 25, and the forward edge of the door panel 35 which is provided with a retaining bead 36. The rear edge of the panel 35 is supported in the same manner as is the rear edge of the panel 28 and it will thus be seen that the doors 11 and 12 will be free to open and in so doing will carry their respective curtain panels 28 and 35 with them.

The rear end of the panel 26 is provided with a flap 37 which is received between a rod 38 and the bow 17 in common with the forward edge of the curtain panel 39 which is provided at its forward edge with an enlargement 40, forming the retaining means for said edge. The rear edge of said panel 39 is provided with a flap similar to the flap 37 which is secured to the bow 16 in a similar manner.

As shown in Fig. 3 the upper edge of the strip 27 is provided with a bead or enlargement 41 which is disposed in the pocket 22 slightly above the bow 19 and a clamping rod 42 is secured at intervals to said bow to limit the downward movement of said curtain. It will thus be seen that the strip 27 and panels 24, 25 and 26 will be held in suspended position. It is to be understood that a flap 43 may be attached adjacent the free edges of each door panel and each of said flaps may be provided with suitable attaching means such as buttons 44 by which the edges of the curtain panels may be removably secured to the door panels of the vehicle body.

Similar flaps 45 as shown in Fig. 4 are secured to the inner sides of the panel members 24, 25 and 26 adjacent their lower edges and are arranged to be removably secured to the stationary panels of the car body adjacent their upper edges by suitable attaching means 46.

The forward edge of the panel 24 extends around the wind shield standard 14 and is removably secured thereto by means of suitable attaching means such as buttons 48 which are arranged in opposed relation to the attaching means 49 arranged to hold the flap 50, which is attached to the panel 24 adjacent its forward edge, against the rear side of the standard 14.

As illustrated in Fig. 5 the flaps 43 are secured to the inner side of the curtain adjacent its edges and project outwardly beyond the edges to engage over the top of the door of the vehicle. It is to be understood that suitable securing means may be arranged adjacent the edges of the curtain 35 and co-operate with securing means on the adjacent curtain thereof providing a storm proof enclosing means.

From the foregoing it will be seen that a particularly tight enclosing means for a car body is provided which will afford complete protection for the occupants of the car and yet permit its ready removal and storage so that the necessity of providing a separate winter top is eliminated. It is to be understood that each panel may be provided with openings or windows which are preferably closed by transparent sheets such as glass, celluloid or the like.

Having thus described our invention and set forth the manner of its construction, application and use, what we claim as new and desire to secure by Letters Patent, is:—

1. In a vehicle top of the class described, comprising a plurality of curtain panels, including a rear door panel, an intermediate section for connecting said panels, a flap secured to the rear edge of said section and the forward edge of said rear door panel, a forked rod adapted to receive between its prongs said flap, a retaining bead on said rear door panel for securing said flap, and means for securing the overlapping edges of said panels and section.

2. In an automobile curtain comprising front and rear door panel flaps, an intermediate section connecting said flaps, buttons for securing the front door flap to the intermediate section, a forked rod secured to the automobile body, the rear edge of said front door panel and the forward edge of the rear door panel secured between the prongs of said forked rod, and flaps adapted to be attached to the inner lower edges of the door panels and removably secured to the automobile body.

In testimony whereof we have signed our names to this specification.

GUY R. HALLOCK.
RALPH VILLANE.